March 2, 1965   V. A. BAKER   3,171,326
RECOIL FRICTION BRAKE FOR AUTOMATIC FIREARMS
Filed March 29, 1962
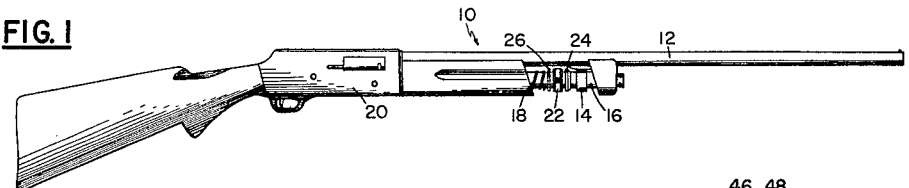
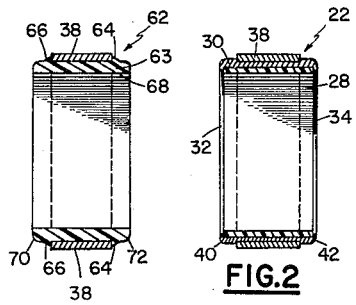
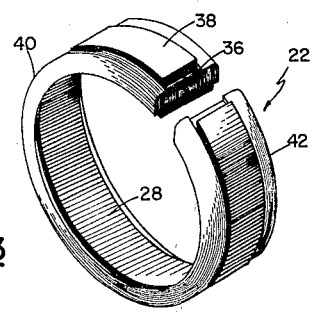
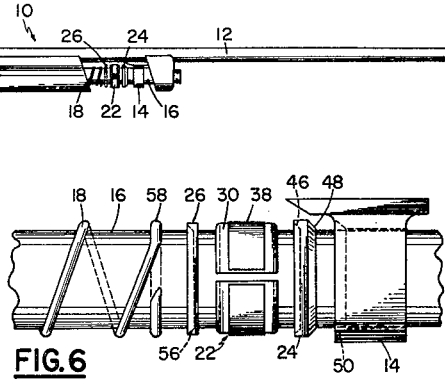
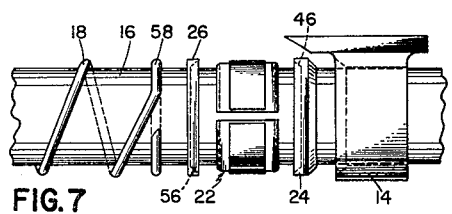
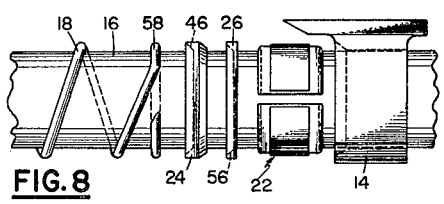
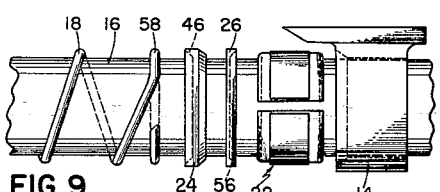
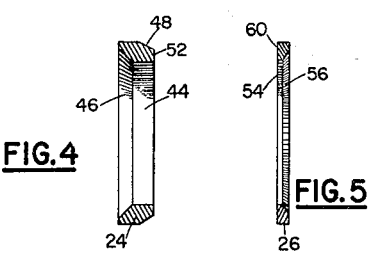
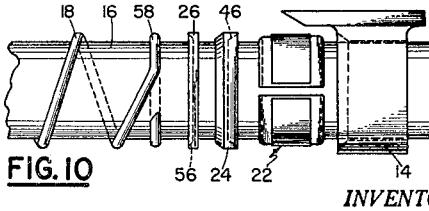
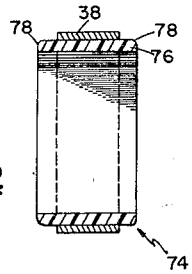
INVENTOR.
VANCE A. BAKER
BY Robert E Breidenthal
ATTORNEY United States Patent Office 3,171,326
Patented Mar. 2, 1965

3,171,326
RECOIL FRICTION BRAKE FOR AUTOMATIC
FIREARMS
Vance A. Baker, Box 465, Norfolk, Nebr., assignor of sixty percent to Charles H. Baker, Wichita, Kans.
Filed Mar. 29, 1962, Ser. No. 183,614
25 Claims. (Cl. 89—177)

This invention relates to new and useful improvements in recoil friction brake systems for automatic firearms, and more particularly pertains to an improved split-ring friction member that includes a split-ring bearing of synthetic resin and the optional additional provision of selectably positionable internally tapered annular members whereby adjustment can be made to accommodate ideally widely variant firing conditions, i.e. skeet loads to magnum loads.

More specifically, the invention has to do with new and useful improvements in the recoil friction brake system of an automatic firearm such as that disclosed in U.S. Patent No. 812,326 issued February 13, 1906, to Browning. The invention involves providing modification structure for enabling a substantial degree of adjustability of recoil retarding or braking effects obtained in the use of the patented as well as extant and other proposed systems involving a metal split-ring (usually brass or steel) having a sliding frictional engagement with the magazine tube. Notwithstanding the obvious applicability of the principles of the invention to afford a wide range of adjustability to conventional braking systems (such as in conjunction with elements of a system in widespread use that employs a length of tubular brass disposed in a steel split-ring spring of shorter length, with the brass tubular element having a slot extending its entire length) as will become apparent presently, the invention is preferably practiced with respect to a system that relies on other than metal-to-metal sliding contact for frictional retardation.

Extant and proposed recoil friction brake systems of the type disclosed in the Browning patent involve a metal-to-metal frictional sliding engagement (conventionally brass-to-steel) that has not been found wholly satisfactory. For one reason, such type of frictional engagement normally involves a rather substantial variation between static and dynamic friction coefficients with the result that an initially high shock load is transmitted directly to the magazine tube and thence to the shoulder of the user through the stock. It is desired that the load increase smoothly and progressively with the relative recoil movements of the barrel and the magazine tube, and such initial shock loading can be objectionably disturbing to the user and result not only in discomfort but in creating a "shyness" conducive to subsequent poor shooting.

The shock loading effect discussed above is not improved with wear of the parts as it appears that wear and the accumulation of abraded metal particles, grit, lint and the like on the magazine tube and between the latter and the metallic friction member also, and for obvious reasons, further deteriorates the desired smoothly varying recoil load and introduces variations in retarding performance between different firings (sometimes very marked between successive firings). Lubrication can also result in performance variations due to temperature changes, and due also to differing quantities and types of lubricants, the latter ordinarily being deemed necessary for the metal-to-metal contact.

It is the primary object of the invention to provide an improved recoil friction brake system for automatic firearms that will afford smoother and more consistent retarding action.

Another object, in accordance with the preceding object is to provide a recoil system that is not conducive to the production of metal particles and that does not require lubrication whereby the deleterious effects of accumulation of dust, grit, lint and the like can be virtually eliminated.

A further object of the invention is to provide a recoil system in accordance with the foregoing objects that will be readily adjustable to accommodate the user to widely variant firing loads.

Yet another object of the invention is to enable simple speedy and economical conversion of extant systems to the enjoyment of realization of the foregoing objects.

Broadly, the invention involves the provision of a modification kit for existing automatic firearms that can be comprised of a split-ring bearing largely or entirely composed of a synthetic resin of the type suitable for bearing use, such split-ring bearing being adapted for reception within a split-ring spring. In one form of the invention, the split-ring bearing can simply be a rectangular strip of flexible polymerized tetrafluoroethylene that is bendable into the split-ring configuration. More sophisticated embodiments of the invention involve a split-ring bearing disposed within a split-ring shell, the latter having its axial extremities inturned about the axial extremities of the split-ring bearing, such shell being adapted for reception within a split-ring spring.

Yet another embodiment of the invention involves the provision of a split-ring bearing that includes integral means defining a pair of axially spaced and opposed shoulders, the arrangement being such that the bearing is adapted to be disposed within a split-ring spring that is seated between the opposed shoulders. The split-ring bearing provided in modification kits can optionally also include a split-ring spring, though this is not necessary as the split-ring spring furnished as a part of original gun equipment can be used for this purpose.

Normally, according to the invention, modification kits incorporating split-ring bearings of the character specified above (either with or without the split-ring spring) also includes an annular member having an internal taper adapted to cooperate directly with the split-ring bearing or the shell disposed thereabout in such a manner as to radially compress the split-ring bearing on the annular member and the split-ring bearing being compressed when in axial alignment. The axial end of the annular member remote from the end adjacent the major dimension of the internal taper is flat or sufficiently blunt so that when such end axially bears compressively against the split-ring bearing no forces are imposed upon the latter tending either to radially compress or expand the split-ring bearing. The split-ring bearing is such as to coact with the internal taper conventionally provided in the barrel lug of automatic firearms in such a manner as to radially compress the split-ring bearing on the latter being forced into the tapered portion of the barrel lug. The internally tapered annular member can be so arranged with respect to the split-ring bearing and the barrel lug so as to selectively replace, augment or have no effect upon the radially compressive force exerted on the split-ring bearing member by the internally tapered barrel lug, and preferably the internal taper of the annular member is of a different degree than that provided in the barrel lug so that the aforementioned selective arrangements enable adjustability of the radially compressive forces imposed on the split-ring bearing in use so that the frictional drag of the split-ring bearing on the magazine tube is adjustable to suit various recoil conditions as occasioned by differing firing loads as, for example, extra light, medium, and magnum loads.

In the preferred practice of the invention, the annular member is provided with an external taper that is complementary to and engageable with the internal taper of the barrel lug, whereby the advantage is realized that the three normal functions of the internally tapered barrel lug—(a) compression of the split-ring member by cam action, (b) centering of the magazine tube relative to the barrel lug to prevent any galling of steel-on-steel contact, and (c) preventing slop or side play of the barrel while maintaining proper alignment of firing—are accomplished by the annular member though with a different degree of cam action by virtue of the positive seating of the annular member in the barrel lug.

The most preferred and sophisticated mode of practice of the invention involves the additional provision of a second annular member having an internal taper for the same purpose as the internal taper of the first annular member, with the internal taper of the second annular member being different from that of the first annular member and also different from that of the barrel lug, whereby the two annular members can be arranged in a variety of different arrangements with respect to the split-ring bearing, thereby to attain a greater degree of flexibility as to the drag imparted by the split-ring bearing during use of the same.

Under circumstances such that metal-to-metal contact is not objectionable to the user, the practice of the invention can involve the provision of two annular members; one having an internal taper and the other having an internal taper and an external taper, with all three of such tapers being of differing degrees and each taper being generally conformable to a cone having an apical angle subtending from about 50 degrees to about 140 degrees; to be used in conjunction with a conventional metallic split-ring bearing or friction member and the conventional steel split-ring spring embracing the latter.

According to the invention, the split-ring bearing is made of a synthetic resin of the types conventionally used as antifriction bearing materials; however, the unusual friction characteristics of polymerized tetrafluoroethylene such as sold under the trademark Teflon are such as to make this particular material vastly preferable to the use of other synthetic resins of the types customarily used for antifriction purposes, though good results can be obtained with any of the latter. Also, according to the invention, it is not only unnecessary to provide oil or grease lubricants for the split-ring bearing on the magazine tube, but it is definitely preferred that the contacting surfaces of the split-ring bearing (when the latter is a synthetic resin) and the magazine tube be and operate in as oil- or grease-free environment as it is practicable to obtain. When using Teflon as the major constituent of the split-ring bearing, it is particularly important and virtually essential to use the same in an oil-free environment.

The invention will be best understood in the light of the following description of preferred embodiments of the invention taken in conjunction with the accompanying drawings wherein:

FIGURE 1 is a side elevational view of an automatic shotgun modified to incorporate the new and improved friction brake recoil system of the present invention, with a portion of the forearm being shown as broken away to reveal the improved system;

FIGURE 2 is an enlarged central vertical sectional view of the split-ring bearing, the view being taken along the axis of the bearing and showing the same disposed within a split-ring spring;

FIGURE 3 is an enlarged perspective view of the structure shown in FIGURE 2;

FIGURE 4 is an enlarged central vertical sectional view of an annular member having an internal and an external taper used in conjunction with the split-ring bearing;

FIGURE 5 is an enlarged central vertical sectional view of another annular member having a flat side and an internal taper that is optionally used along with the annular member shown in FIGURE 4 with the split-ring bearing;

FIGURES 6 through 10, inclusive, are enlarged elevational detail views showing the structures of FIGURES 2, 3, 4 and 5 as applied in various alternative arrangements to the magazine tube and the coiled compression spring and the internally tapered barrel lug, hidden internal details of structure being shown in dashed outline;

FIGURE 11 is an enlarged central vertical sectional view of a modified embodiment of the split-ring bearing, the same being shown with the split-ring spring applied thereto; and, FIGURE 12 is an enlarged central vertical sectional view of yet another embodiment of the split-ring bearing, the same being shown with the split-ring spring applied thereto.

Referring now to the drawings, wherein like reference numerals designate similar parts throughout the various views, the reference numeral 10 designates a semiautomatic shotgun generally. As is conventional, the shotgun 10 includes a barrel 12 to which a depending barrel lug 14 is fixedly secured. A magazine tube 16 is disposed below the barrel 12 in parallelism thereto, and slidably extends through the barrel lug 14.

The recoil system of the shotgun 10 also conventionally includes a compression spring 18 that is coiled about the magazine tube 16 in a position intermediate the barrel lug 14 and the breech mechanism portion 20 of the shotgun 10. For purposes of clarity, the compression spring 18 is shown as retracted somewhat from its normal position so as to expose more fully a new and improved friction member 22 and annular members 24 and 26 disposed on the magazine tube 16 intermediate the barrel lug 14 and the coiled compression spring 18.

The split-ring bearing 22 is best shown in FIGURES 2 and 3 wherein the same is shown to be comprised of a split-ring or split-band of synthetic resin 28. The split-ring of synthetic resin 28 is largely or entirely comprised of a synthetic resin of such types as are conventionally used in bearings in antifriction applications. For example, the split-ring bearing 28 can be and preferably is largely or entirely composed of polymerized tetrafluoroethylene such as is commonly marketed under the trademark Teflon. Very satisfactory results can be obtained when the split-ring bearing 28 is made of polyamide resins such as are commonly referred to a nylon. Other examples of suitable synthetic resins are polymerized olefins such as high density polyethylene and polypropylene respectively obtainable as Aeroflex and Maplen. Polymerized chlorotrifluoroethylene such as sold under the trademark Fluoroflex can also be used. These materials are suitable for the bearing 28 either alone or in mixture with each other. A mixture of polyethylene with nylon will give good results, for example.

It will be noted that the materials indicated above as being suitable as material for the bearing 28 are characterized by having slick, smooth or waxy appearing surfaces, and (at least with appropriate densities) have been used as bearings in a wire variety of antifriction applications. Other synthetic resins or mixtures thereof possessing such properties and of sufficient density as to have adequate physical strength and flexibility without impracticable brittleness can ordinarily be used as the material for the bearing 28. It is preferable that the material constituting the bearing 28 be of thermoplastic character, it being noted that this property will facilitate fabrication of the part. As a further guide in selecting a synthetic resin for the bearing 28, most thermoplastic synthetic resins characterized by medium to very low coefficients of friction with metals without oil or grease lubrication and possessive of sufficient strength and flexibility without impracticable brittleness are satisfactory, while synthetic resins possessing rubber-like characteristics (such as to becoming galled by dry rubbing contact with metals) and presenting other than a slick or waxy-like surface appearance and feel (such as neoprene) are to be avoided.

Notwithstanding the fact that good results can be obtained when the split-ring bearing 28 is comprised of other materials, it is again emphasized that it is believed that superior results are obtained substantially surpassing for the purposes of this invention the results realized on testing any other materials when the split-ring bearing 28 is comprised of polymerized tetrafluoroethylene such as is commonly sold under the trademark Teflon. In general, solid polymerized halogen substituted olefins are preferred as a class of materials from which the split-ring bearing 28 is made in whole or in part. Notwithstanding the fact that the function of the split-ring bearing 28 (as will be seen presently) is to produce a frictional drag on the magazine tube 16, it is believed that the superior results obtained in the use of Teflon can be attributed to the unusual coefficient of friction characteristics of Teflon on metals, though it is not intended that I be bound by any such belief or theory of operation. As is common knowledge, Teflon possesses an extremely low coefficient of friction with metals, and a further peculiarity obtains in that the dynamic coefficient of friction is almost as great, if not as great, as the static coefficient of friction. It is conjectured that these unusual frictional properties of Teflon produce the highly advantageous and surprising results obtained in the use of this material for the purposes of the present invention.

A metallic split-ring shell 30 of relatively thin-wall thickness which can conveniently be of steel or brass embraces and directly contacts the split-ring bearing 28 with the gaps in the split-ring shell 30 and the split-ring bearing 28 being preferably through not absolutely required in registry, as plainly shown in FIGURE 3. The axial extremities of the metallic shell 30 are inturned or provided with radially inward extending flanges 32 and 34 between which the axial extremities of the split-ring bearing 28 are received, it being noted that the internal diameter of the inturned portions or flanges 32 and 34 of the shell 30 is greater than that of the split-ring bearing 28.

The external surface of the metallic shell 30 is grooved or reduced in external diameter along an intermediate portion of its axial extent as indicated at 36 to provide a seat for a split-ring spring 38. Though so shown, the gap in the split-ring spring 38 does not have to be in registry with the gaps of either one or both the split-ring bearing 28 or the metallic shell 30. In the preferred construction, the external surfaces of the axial extremities of the metallic shell are tapered or rounded as indicated at 40 and 42.

Attention is now directed to FIGURE 4, wherein the annular member 24 is shown in detail. The annular member 24 has a cylindrical inner surface 44 that makes a free sliding fit on the magazine tube 16, and the annular member 24 is provided with an internal taper 46 having a major internal dimension sufficient to engage one of the rounded or tapered portions 40 or 42 of the metallic shell 30 so as to subject the metallic shell 30 to a radially compressive force on the metallic shell 30 and the annular member 24 being axially aligned and forced together. Though so shown, it is not essential that the degree of the taper 46 be strictly uniform throughout its axial extent, and the illustrated construction is normally preferred. The taper 46 can conform or approximate throughout its axial extent conformity with a conical surface having an apical angle of from about 50 to about 140 degrees, the same being shown as conforming to an apical angle of 90 degrees. The annular member 24 is provided at its end opposite from the major dimension of the taper 46 with an external taper 48 that is preferably complementary to and engageable with the internal taper 50 of the barrel lug 14. It will be noted that in the preferred construction, the end of the annular member 24 provided with the taper 48 has a flat surface 52 suitable for engagement with the metallic shell 30 in such a manner that the metallic shell 30 is subjected to neither a radially compressive nor expansive force.

Attention is now directed to FIGURE 5, wherein the annular member 26 is shown in detail. The annular member 26 is provided with a cylindrical inner surface 54 that makes a smooth sliding fit on the magazine tube 16, and the same is provided with an internal taper 56 generally similar to the internal taper 46, but preferably of a different degree. The taper 56 can be generally conformable to a conical surface having an apical angle of from about 50 to about 140 degrees, and is shown as being conformable to a conical surface having an apical angle of about 110 degrees.

As indicated previously, the tapers 46 and 56 are susceptible to wide ranges of variation with the principal desideratum to be observed in assigning or selecting values for the degrees of taper involved being that they each differ substantially from each other and also from the degree of the internal taper 50 of the barrel lug 14. Though the degree of the taper 56 is shown as being greater than the degree of taper 46, such arrangement can, if desired, be reversed. Also notwithstanding the fact that the tapers 46 and 56 are shown as being of constant degree or of purely conical nature throughout their axial extents, this arrangement is not essential and the internal surfaces of the tapers 46 and 56 (either one or both) can present a convex or concave appearance in longitudinal section as a minor departure from a strictly conical surface under circumstances such that a variation in the camming effect produced by the tapered surface directed toward radial compression of the split-ring bearing is desired to be a function of the axial force urging the annular member into engagement with the split-ring bearing differing from that characterized by a strictly conical surface. Similarly, if deemed necessary or expedient, the internal taper 50 of the barrel lug 14 can also be given either a convex or a concave profile in longitudinal section. The general range of approximate taper of the surface can be such as indicated for the tapers 46 and 56, while keeping the taper 48 complementary to the taper 50 and giving all the tapers 50, 46 and 56 differing values.

The annular members 24 and 26 can be made of synthetic resins such as nylon and Teflon of sufficient hardness if desired; however, it is preferred that such members 24 and 26 be metallic with steel or brass being suitable and with steel being especially preferred.

Attention is now directed to FIGURES 6 through 10, inclusive, wherein a plurality of different arrangements of the annular members 24 and 26 in relation to the split-ring bearing 22, the barrel lug 14 and the spring 18 are shown. As in the case of FIGURE 1, the spring 18 is shown as displaced to the left from its normal position for purposes of clarity, it being understood that the right hand end of the spring 18 (which has its final turn 58 bent to lie in a plane normal to the axis of the magazine tube 16) normally biases the elements on the magazine tube 16 between the spring 18 and the barrel lug 14 against the latter. FIGURE 6 shows the split-ring bearing 22 and the annular members 24 and 26 disposed on the magazine tube 16 intermediate the spring 18 and the barrel lug 14 in an arrangement well suited for the handling of the recoil occasioned by the use of extra light firing loads in the shotgun 10 such as in the case of trap and skeet shooting. In this instance, the split-ring bearing 22 is subjected on compression solely by the camming action of the taper 46, it being noted that the degree of the taper 46 is greater than that of the internal taper 50 of the barrel lug 14, so that a lesser radially compressive force is exerted on the split-ring bearing 22 than would occur if the annular member 24 were omitted. Also, it will be noted that the flat side 60 of the annular member 26 is disposed so as to face the split-ring bearing 22 and thereby to not effect the radial compression or expansion of the split-ring bearing 22. Accordingly, the annular member 26 performs no function in the arrangement shown in FIGURE 6 and can, if desired, be removed from the gun 10. The illustrated position is convenient from the storage standpoint and avoids any possibility of the member 26 becoming misplaced.

The arrangement of the bearing 22 and the members 24 and 26 shown in FIGURE 6 and the description of the same as being suited to extra light firing loads is of course based on the values of the tapers 50, 46 and 56 illustrated. It will be evident that the retardation characteristics described in connection with FIGURE 6 and those to be described in connection with FIGURES 7 through 10 are based on the illustrated tapers 50, 46 and 56. It will become obvious as the description proceeds that selection of other values for one or more of the tapers 50, 46 and 56 will produce different retardation effects for any particular arrangement of the components 22, 24, and 26, ad it is deemed within the skill of the art in the light of this disclosure to make selection of differing values of the tapers and such arrangements of the components 22, 24 and 26 to achieve the desired retardation characteristics for any particular firing load. This is particularly true when it is recognized that the camming effect of any of the tapers 50, 46 and 56 arranged to engage the bearing 22 and the consequent frictional retardation effect resuting therefrom will tend to increase with tapers corresponding to cones of decreasing apical angle. Selection of taper angles near the ends or somewhat beyond the ranges therefor previously set forth should usually be avoided (though they can frequently be used to advantage) for the reasons that camming effectiveness tends to decrease rapidly for higher apical angles and because lower apical angles may deleteriously affect some synthetic resins over a period of time when the latter are directly contacted by the tapered surface. Obviously, the latter consideration does not apply with respect to the bearing 22.

FIGURE 7 shows an arrangement well suited to the handling of the recoil occasioned during the use of light loads, the arrangement shown in FIGURE 7 differing from that shown in FIGURE 6 only in that the position of the annular member 26 is reversed so that the internal taper 56 contributes to the radial compression of the split-ring bearing 22 during recoil.

FIGURE 8 illustrates an arrangement of the annular members 24 and 26 with respect to the split-ring bearing 22 that is well suited to the firing of medium loads when using the relative degrees of taper for the tapers 50, 46 and 56 shown in the drawings. In this connection, the illustrated degree of the taper 50 is such as that conventionally used in extant firearms, and has a value corresponding to a cone having an apical angle of 70 degrees. The taper of another widely used firearm corresponding to taper 50 has an apical value of 60 degrees.

It will be noted that the annular members 24 and 26 do not perform any camming function on the split-ring bearing 22 in the arrangement shown in FIGURE 8, and accordingly, either one or both of the annular members 24 and 26 can be omitted, or if desired interchanged in their positions on the magazine tube 16 without producing any change in the recoil action achieved.

FIGURE 9 shows an arrangement of the annular members 24 and 26 with respect to the split-ring bearing 22 that is suitable for the handling of medium to high loads. While the annular member 24 does not perform any camming function in the arrangement shown in FIGURE 9 and can be omitted if desired from such arrangement, the taper 56 of the annular member 26 does perform a camming function on the split-ring bearing 22 and augments the camming function of the internal taper 50 of the barrel lug 14.

FIGURE 10 illustrates yet another arrangement of the annular members 24 and 26 with respect to the split-ring bearing 22 that is particularly well suited to the handling of magnum loads. In this arrangement, the annular member 26 does not perform any camming function on the split-ring bearing 22 and can, if desired, be omitted from the arrangement. In the arrangement shown in FIGURE 10, the taper 46 of the annular member 24 serves a camming function and augments that of the internal taper 50 of the barrel lug to impose a total radially compressive load on the split-ring bearing 22 that is sufficient to result in a drag adequate for the relatively high recoil action obtained in the firing of magnum loads.

In all of the arrangements shown in FIGURES 6 through 10, inclusive, the function of the split-ring spring 38 is identical with that of such part in existing automatic firearms, it being noted that large numbers of automatic firearms are currently in use and on sale employing a split-ring steel spring 38 in conjunction with a split-brass sleeve disposed therein. It will be understood that the split-ring spring 38 employed with the split-ring bearing 22 can be supplied as a new item of equipment or the extant split-ring spring can be used in conjunction with the split-ring bearing 22. It is again pointed out that while so shown, it is not necessary that the gap in the split-ring spring 38 coincide with the gap in the split-ring bearing 22.

Attention is now directed to a modified embodiment of the split-ring bearing that is shown in FIGURE 11 and designated generally by the reference numeral 62. The modified split-ring bearing 62 can be comprised of a body 63 of a material such as previously indicated as being suitable for forming the element 28 of the split-ring bearing 22, and although not shown in the drawings, it will be understood that the body 63 of the split-ring bearing 62 is provided with a gap such as is plainly shown for the bearing 22 in FIGURE 3. The body 63 of the split-ring bearing 62 has a longitudinal cross section such as shown in FIGURE 11 so as to include a pair of integral opposed shoulders 64 and 66 that are spaced so as to receive the split-ring spring 38 therebetween with the split-ring spring 38 being in direct contact with the synthetic resin body 63 of the split-ring bearing 62. As shown, the internal surface 68 of the body 63 of the split-ring bearing 62 is generally conformable to a cylindrical surface, and the external axial extremities thereof are preferably rounded or tapered as indicated at 70 and 72 for improved engagement with the tapers 50, 46 and 56. If desired, the synthetic resin body 63 of the split-ring bearing 62 can be molded directly into its final configuration, or can be molded as an entire annular ring and subsequently sawn or otherwise cut to provide the gap giving the same a split-ring configuration. Alternatively, the synthetic resin constituting the body 63 of the split-ring bearing 62 can be such that the same can be extruded as a straight strip of suitable length, and subsequently bent or formed into a C-shape (with the application of heat as may be required) for reception within the steel split-ring spring 38.

FIGURE 12 illustrates yet another embodiment of the split-ring bearing, such further embodiment being designated generally by the reference numeral 74. The body 76 of the split-ring bearing 74 can be formed of materials such as previously indicated as suitable for the synthetic resin components of the split-ring bearings 22 and 62. The synthetic resin body 76 of the split-ring bearing 74 is identical to the synthetic resin component of the previously described split-ring bearing 62 except for the omission of any integral shoulders on the external surface of the body 76 of the split-ring bearing 74, it being noted that the external axial extremities of the body 76 are rounded or tapered as indicated at 78. As in the case of the split-ring bearing 62, the split-ring spring 38 surrounds and directly engages the synthetic resin body 76.

As indicated previously, it is preferred that the annular member 24 or the annular members 24 and 26 be used in combination with the split-ring bearings of the types incorporating synthetic resin such as herein disclosed; however, such member or members can be used in combination with extant split-ring friction members (such as a split-brass sleeve centrally embraced by an axially shorter steel split-ring spring), and can be supplied as a modification kit for use therewith.

Inasmuch as the illustrated embodiments of the invention are subject to numerous variations without departing from the actual scope of the invention, attention is directed to the appended claims in order to determine the actual scope of the invention.

I claim:

1. In a friction recoil brake for firearms of the class wherein a split-ring friction member is disposed about a magazine tube between a compression spring coiled about the magazine tube and a barrel lug through which the magazine tube slidably extends, the combination therewith of an annular member slidably disposed on the magazine tube immediately adjacent the split-ring friction member, said split-ring friction member including a split-ring bearing comprised of a synthetic resin directly engaging the magazine tube, said annular member having an internally tapered surface cammingly engaging an axial end portion of the split-ring friction member so as to radially compress the latter on compressive axial engagement of the annular member and the split-ring friction member when the major internal dimension of the tapered surface is directed toward the split-ring friction member, and said annular member being selectively positionable on the magazine tube with the major internal dimension of the tapered surface directed toward and away from the split-ring friction member, said resin being selected from the group consisting of a polymerized halogen-substituted unsaturated low molecular weight hydrocarbon, nylon, a polymerized unsaturated low molecular weight hydrocarbon, and mixtures thereof.

2. The combination of claim 1, wherein said synthetic resin is a polymerized halogen-substituted unsaturated low molecular weight hydrocarbon.

3. The combination of claim 1, wherein the annular member and the barrel lug are respectively provided with complementary externally and internally tapered surfaces, and wherein the internally and externally tapered surfaces of the annular member are of differing degrees of taper.

4. In a friction recoil brake for firearms of the class wherein a split-ring friction member is disposed about a magazine tube between a compression spring coiled about the magazine tube and a barrel lug through which the magazine tube slidably extends and wherein the barrel lug has an internal taper opening toward the split-ring friction member in an arrangement such that compressive axial engagement of the lug with the split-ring friction member radially compresses the latter, the combination therewith of an annular member slidably disposed on the magazine tube immediately adjacent the split-ring friction member at the axial end of the latter remote from the barrel lug, said split-ring friction member including a split-ring bearing comprised of a synthetic resin directly engaging the magazine tube, said annular member having an internally tapered surface cammingly engaging the split-ring friction member to radially compress the split-ring member on compressive axial engagement of the annular member and the split-ring friction member, said annular member being selectively positionable on the magazine tube on either side of the split-ring bearing and with the major internal dimension of the taper directed toward and away from the split-ring friction member, and the degree of taper of the tapered internal surface of the annular member being different from that of the barrel lug.

5. The combination of claim 4, wherein the end of the annular member nearest the minor end of the internally tapered surface there is provided with an external taper complementary to the internal taper of the barrel lug.

6. In a friction recoil brake for firearms of the class wherein a split-ring friction member is disposed about a magazine tube between a compression spring coiled about the magazine tube and a barrel lug through which the magazine tube slidably extends, the combination therewith of two annular members slidably disposed on the magazine tube on opposite sides of and immediately adjacent the split-ring friction member, said annular members having internally tapered surfaces cammingly engaging the opposite ends of the friction member to radially compress the split-ring friction member on compressive axial engagement of the annular member and the split-ring friction member, at least one of said annular members being selectively positionable on the magazine tube with the major internal dimension of the internally tapered surface thereof opening toward and away from the split-ring friction member, and said split-ring friction member including a split-ring bearing comprised of a synthetic resin directly engaging the magazine tube.

7. The combination of claim 6, wherein the degree of taper of the internally tapered surface of one of the annular members differs from that of the other.

8. The combination of claim 7, wherein the barrel lug has an internal taper differing from that of either of the annular members.

9. The combination of claim 8, wherein one of the annular members has an external taper substantially complementary to and engageable with the internal taper of the barrel lug.

10. In a friction recoil brake for firearms of the class wherein a split-ring friction member is disposed about a magazine tube between a compression spring coiled about the magazine tube and a barrel lug through which the magazine tube slidably extends, the combination therewith of an annular member slidably disposed on the magazine tube immediately adjacent the split-ring friction member, said split-ring friction member comprising a split-ring bearing of synthetic resin directly engaging the magazine tube and a split-ring spring disposed about the split-ring bearing, said annular member having an internally tapered surface cammingly engaging the split-ring friction member to radially compress the split-ring friction bearing on compressive axial engagement of the annular member and the split-ring friction member, and said annular member being selectively positionable on the magazine tube with the major internal dimension of the tapered surface directed toward and away from the split-ring friction member.

11. For use in a friction recoil brake for firearms, a split-ring friction member comprising, a split-ring bearing of a synthetic resin, and a split-ring spring disposed about the split-ring bearing.

12. The combination of claim 11, including a split-ring metallic shell interposed between the split-ring spring and the split-ring bearing with the gaps in the shell and the member being essentially in registry, and the axial extremities of the shell being inturned about the axial extremities of the bearing.

13. The combination of claim 11, wherein the split-ring spring directly engages the split-ring bearing.

14. The combination of claim 13, wherein said split-ring bearing includes integral means defining a pair of axially spaced, radially extending and opposed shoulders, and said split-ring spring being disposed between said shoulders.

15. The combination of claim 13, wherein the axial extent of the split-ring bearing is greater than that of the split-ring spring, and said split-ring bearing being essentially cylindrical throughout substantially its entire axial extent.

16. For use in the friction member of a friction recoil brake for firearms, the improvement comprising, a split-ring bearing of synthetic resin, a metallic split-ring shell disposed about the bearing with the gaps of the bearing and the shell essentially in registry, and the axial extremities of the shell being inturned about the axial extremities of the bearing.

17. For use in the friction member of a friction recoil brake for firearms, the improvement comprising, a split-ring bearing of polytetrafluoroethylene, said bearing including integral means defining a pair of axially spaced, radially extending and opposed shoulders and a split-ring spring embracing the bearing between the shoulders, said shoulders being substantially spaced inwardly from the axial extremities of the bearing.

18. For use in a friction recoil brake system for firearms, the improvement comprising, a split-ring bearing of polymerized tetrafluoroethylene, a metallic split-ring shell disposed about the bearing, radially inward extending flanges at the axial extremities of the shell between which the bearing is disposed, with the outer peripheral surfaces of the shell being inclined to the axis of the shell at the extremities of the latter, and an annular member coaxial with said bearing and having an internally tapered surface at one end thereof in camming engagement with one of said surfaces for radially compressing the shell and the bearing therein upon the shell and the annular member being jointly under axial compression.

19. For use in a friction recoil brake system for firearms, the improvement comprising a flexible rectangular strip of polymerized tetrafluoroethylene flexed into a split-ring configuration, a split-ring spring embracing the flexed strip, and an annular member having an axial, internally tapered surface at one end thereof, said member being coaxial with the flexed strip and having the internally tapered surface thereof in camming engagement with an axial extremity of the strip.

20. For use in a friction recoil brake system for firearms, the improvement comprising a split-ring bearing of polymerized tetrafluoroethylene, said bearing including integral means defining a pair of axially spaced and opposed shoulders adapted to receive therebetween a split-ring spring embracing the bearing, and an annular member in coaxial alignment with the bearing and having an axial internally tapered surface in camming engagement with an end of the bearing so as to radially compress the bearing upon such elements being axially compressed.

21. In a friction recoil brake system for firearms of the class including a coiled compression spring on a magazine tube and a barrel lug having an internally tapered opening therethrough through which the magazine tube slidably extends; the combination therewith of a split-ring friction member on the magazine tube and engaged between the spring and the barrel lug, said friction member comprising a split-ring bearing member of polytetrafluoroethylene engaging the magazine tube and a split-ring spring disposed about and radially compressing the split-ring bearing into engagement with the magazine tube, and said split-ring friction member having an end in camming engagement with the internally tapered surface of the barrel lug.

22. For use in recoil systems of firearms, a friction member comprising a split-ring bearing of synthetic resin, a metallic split-ring shell disposed about the bearing, and a metallic split-ring spring disposed about and radially compressing the shell and the bearing.

23. The combination of claim 22, wherein means is provided for limiting free relative axial movement of the shell with respect to the bearing and the spring.

24. The combination of claim 23, wherein said means comprises said shell having a pair of opposed, axially spaced shoulders with the spring being disposed between said shoulders, and said shell having radially inward directed ribs at its opposite axial extremities that engage axial extremities of the bearing.

25. The combination of claim 23, wherein the resin is polytetrafluoroethylene, and the bearing, the shell and the spring having gaps in approximate registry with each other.

References Cited by the Examiner

UNITED STATES PATENTS

| | | | |
|---|---|---|---|
| 812,326 | 2/06 | Browning | 89—177 |
| 1,931,262 | 10/33 | Loomis | 89—177 |
| 2,400,099 | 5/46 | Brubaker et al. | 264—127 |
| 2,675,283 | 4/54 | Thomson | 308—238 |

FOREIGN PATENTS 720,620   12/54   Great Britain.

BENJAMIN A. BORCHELT, *Primary Examiner.*

FRED C. MATTERN, JR., SAMUEL FEINBERG,
*Examiners.*